United States Patent
Lee et al.

(10) Patent No.: US 9,979,051 B2
(45) Date of Patent: May 22, 2018

(54) METHOD FOR PREPARING LITHIUM SECONDARY BATTERY AND LITHIUM SECONDARY BATTERY PREPARED THEREFROM

(71) Applicant: LG Chem, Ltd., Seoul (KR)

(72) Inventors: Su Rim Lee, Daejeon (KR); Song-Taek Oh, Daejeon (KR); Jung-Seok Choi, Daejeon (KR); Hyeok-Moo Lee, Daejeon (KR); Ji-Hye Park, Daejeon (KR)

(73) Assignee: LG Chem, Ltd. (KR)

( * ) Notice: Subject to any disclaimer, the term of this patent is extended or adjusted under 35 U.S.C. 154(b) by 478 days.

(21) Appl. No.: 14/516,739

(22) Filed: Oct. 17, 2014

(65) Prior Publication Data

US 2015/0118542 A1 Apr. 30, 2015

(30) Foreign Application Priority Data

Oct. 31, 2013 (KR) ........................ 10-2013-0131051

(51) Int. Cl.
*H01M 10/058* (2010.01)
*H01M 10/052* (2010.01)
(Continued)

(52) U.S. Cl.
CPC ......... *H01M 10/058* (2013.01); *H01M 4/505* (2013.01); *H01M 4/525* (2013.01);
(Continued)

(58) Field of Classification Search
CPC ............. H01M 10/058; H01M 10/052; H01M 10/049; H01M 10/446; H01M 4/505; H01M 4/525
See application file for complete search history.

(56) References Cited

U.S. PATENT DOCUMENTS 8,021,773 B1 * 9/2011 Simon ............... H01M 10/4207
429/149
2006/0200972 A1 * 9/2006 Onishi ............... H01M 2/1016
29/623.1

(Continued)

FOREIGN PATENT DOCUMENTS

KR      1020080036250 A1 *  4/2008 ............. H01M 2/10
KR      2011-0115844 A      10/2011
(Continued)

OTHER PUBLICATIONS

Machine Translation of: KR 1020080036250 A1, Yoo, Apr. 28, 2008.*
Machine Translation of: KR 1020110115844 A1, Oh et al., Oct. 24, 2011.*

*Primary Examiner* — Kenneth J Douyette
(74) *Attorney, Agent, or Firm* — Lerner, David, Littenberg, Krumholz & Mentlik, LLP

(57) ABSTRACT

The present disclosure provides a method for preparing a lithium secondary battery by bringing a first cell using a first cathode active material of formula (I)

$$Li(Li_xM_{y-y'}M'_{y'})O_{2-z}A_z \quad (I)$$

wherein, x, y, y', and z satisfy $0<x<0.5$, $0.6<y<1.1$, $0\leq y'<0.2$, and $0\leq z<0.2$, M is any one selected from the group consisting of Mn, Ni, Co, Fe, Cr, V, Cu, Zn, and Ti, M' is any one selected from the group consisting of Al, Mg and B; and A is any one selected from the group consisting of F, S and N and a second cell using a second cathode active material being generally used into activation under different voltage conditions, and then electrically connecting the first cell and the second cell in the step of assembling unit cells; and a (Continued)

lithium secondary battery prepared from the method. According to the present disclosure, a lithium secondary battery can be prepared by bringing a first cell using a first cathode active material of formula (I) and a second cell using a second cathode active material being generally used into activation under different voltage conditions, and then electrically connecting the first cell and the second cell in the step of assembling unit cells, thereby achieving high capacity from the first cell and life performance improvement from the second cell in balance.

6 Claims, 1 Drawing Sheet

(51) Int. Cl.
| | |
|---|---|
| *H01M 4/505* | (2010.01) |
| *H01M 4/525* | (2010.01) |
| *H01M 4/58* | (2010.01) |
| *H01M 10/04* | (2006.01) |
| *H01M 10/44* | (2006.01) |
| *H01M 10/0525* | (2010.01) |
| *H01M 10/52* | (2006.01) |

(52) U.S. Cl.
CPC ....... *H01M 4/5825* (2013.01); *H01M 10/049* (2013.01); *H01M 10/052* (2013.01); *H01M 10/446* (2013.01); *H01M 10/0525* (2013.01); *H01M 10/52* (2013.01); *Y10T 29/49108* (2015.01)

(56) References Cited

U.S. PATENT DOCUMENTS

| | | | |
|---|---|---|---|
| 2008/0070103 A1* | 3/2008 | Lin | ............ H01M 4/133 429/101 |
| 2013/0224585 A1 | 8/2013 | Oh et al. | |
| 2013/0260249 A1* | 10/2013 | Choi | ............ H01M 4/0404 429/223 |

FOREIGN PATENT DOCUMENTS

| | | |
|---|---|---|
| KR | 2011-0118225 A | 10/2011 |
| KR | 10-1123059 B1 | 3/2012 |
| KR | 2013-0031079 A | 3/2013 |
| KR | 10-1264497 A | 5/2013 |
| KR | 10-1264497 B1 | 5/2013 |

\* cited by examiner

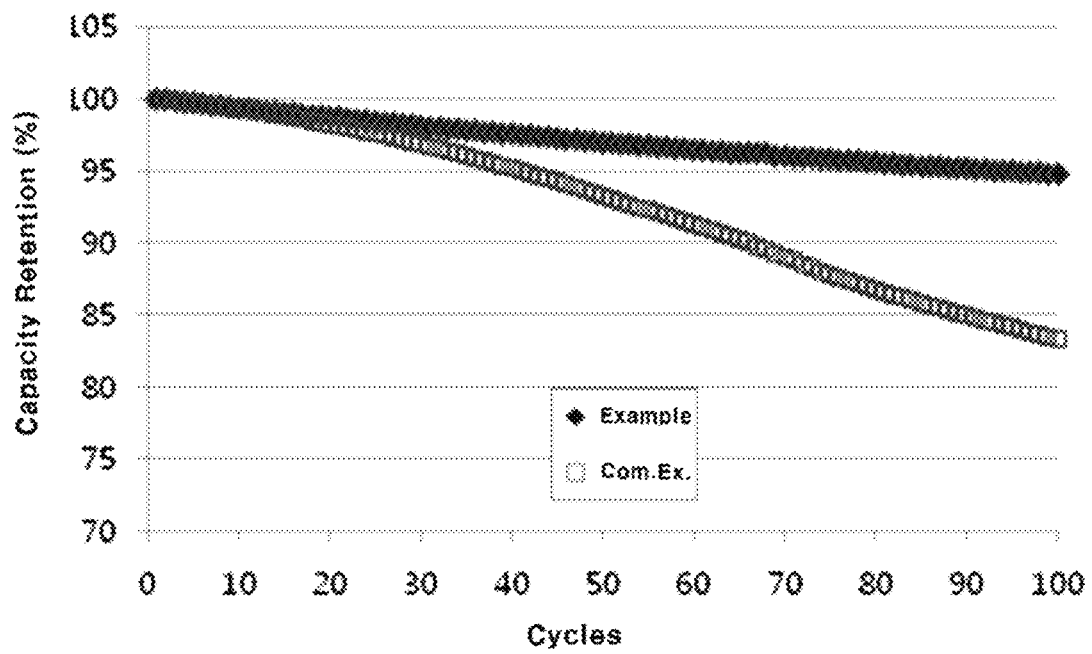

METHOD FOR PREPARING LITHIUM SECONDARY BATTERY AND LITHIUM SECONDARY BATTERY PREPARED THEREFROM

CROSS-REFERENCE TO RELATED APPLICATION

This application claims priority to Korean Patent Application No. 10-2013-0131051 filed in the Republic of Korea on Oct. 31, 2013, which is incorporated herein by reference.

TECHNICAL FIELD

The present disclosure relates to a method for preparing a lithium secondary battery, more specifically to a method for preparing a lithium secondary battery, which comprises electrically connecting cells each other, each of the cells comprising a cathode active material different from each other; and a lithium secondary battery prepared therefrom.

BACKGROUND ART

Recently, there has been an increasing interest in energy storage technology. As the application fields of energy storage technologies have been extended to cellular phones, camcorders, notebook computers, PCs and electric cars, the demand for high energy density of batteries as a power source has been increasing. Lithium secondary batteries have been proposed as a battery that can satisfy such a demand, and their researches are being actively made.

However, the lithium secondary batteries may cause safety problems such as ignition and explosion and are difficult to be produced because an organic electrolytic solution is used therein. Particularly, the lithium secondary batteries have recently been used under various conditions and environments as their application range is greatly expanded. As a result, a demand for lithium secondary batteries with a higher capacity is gradually increasing. In order to provide lithium secondary batteries with a higher capacity, the operation ranges of an electrode tend to be expanded, for example, into a high voltage. Such a high voltage is favorable in terms of battery capacity, but may cause more serious safety problems.

Generally, a lithium secondary battery is prepared by carrying out an activation process that initially charges a battery in the state of discharging. In particular, a lithium-containing compound with a layered structure, represented by the following formula (I), has a specific uniform potential in the region of 4.3 to 4.8 V, unlike other cathode materials that have been conventionally known, and should go through an activation process at high voltage conditions above such uniform potential voltage region so as for the compound to exhibit a high capacity through the structural variation thereof. In the activation process, the lithium-containing compound used as a cathode active material is subject to structural variation at a high voltage, from which large amounts of gases may be generated and remained within the battery to deteriorate the transfer of lithium ions and result in Li plating locally. Therefore, gases generated during the activation process should be removed.

Meanwhile, a lithium secondary battery that has a cathode comprising a cathode active material represented by the following formula (I) exhibits a high capacity when being activated at a high voltage, but has poor life time and low rate characteristics owing to its local structure change, as compared with a lithium secondary battery having a cathode comprising a general layered lithium-metal oxide. In order to compensate such poor life time and low rate characteristics, there has been an attempt that a cathode active material represented by the following formula (I) is mixed with a general layered lithium-metal oxide such as $LiNi_{1-x-y}Co_xMn_yO_2$ ($0 \leq x \leq 0.5$, $0 \leq y \leq 0.5$) and $LiCoO_2$ in the preparation of an electrode to obtain a cathode and then a cell. However, when a cell comprising such a mixed cathode active material is initially activated under high voltage, the general layered lithium-metal oxide undergoes durability deterioration to result in the rapid life shortening and performance deterioration of the cell during operation. For this reason, such a cell is difficult to be commercialized.

wherein, x, y, y', and z satisfy $0<x<0.5$, $0.6<y<1.1$, $0 \leq y'<0.2$, and $0 \leq z<0.2$, M is any one selected from the group consisting of Mn, Ni, Co, Fe, Cr, V, Cu, Zn, and Ti, M' is any one selected from the group consisting of Al, Mg and B; and A is any one selected from the group consisting of F, S and N.

DISCLOSURE

Technical Problem

The present disclosure is designed to solve the above-mentioned problems, and therefore it is an object of the present disclosure to provide a method for preparing a lithium secondary battery by bringing a first cell using a first cathode active material of the above formula (I) and a second cell using a second cathode active material being generally used into activation under different voltage conditions, and then electrically connecting the first cell and the second cell in the step of assembling unit cells; and a lithium secondary battery prepared from the method.

Technical Solution

In order to achieve the above object, in accordance with one aspect of the present disclosure, there is provided a method for preparing a lithium secondary battery, comprising: (S1) bringing a first cell comprising a first cathode active material of formula (I) into activation under voltage conditions being above uniform potential voltage region that the structural variation of the first cathode active material occurs, and bringing a second cell comprising a second cathode active material into activation under voltage conditions being below uniform potential voltage region that the structural variation of the first cathode active material occurs; and (S2) electrically connecting the first cell and the second cell in parallel or series:

wherein, x, y, y', and z satisfy $0<x<0.5$, $0.6<y<1.1$, $0 \leq y'<0.2$, and $0 \leq z<0.2$, M is any one selected from the group consisting of Mn, Ni, Co, Fe, Cr, V, Cu, Zn, and Ti, M' is any one selected from the group consisting of Al, Mg and B; and A is any one selected from the group consisting of F, S and N.

In the present disclosure, the voltage region that the structural variation of the first cathode active material occurs may be in the range of a uniform potential voltage ranging from 4.3 to 4.8 V.

Also, the second cathode active material may be any one selected from the group consisting of LiNiO$_2$, LiCoO$_2$, LiMn$_2$O$_4$, LiFePO$_4$, LiNi$_x$Co$_{x-1}$O$_2$ (1≤x≤2), LiNi$_{1-x-y}$Co$_x$Mn$_y$O$_2$ (0≤x≤0.5, 0≤y≤0.5), and a mixture thereof.

The second cell may be brought into activation under voltage conditions of 4.3V or less.

Meanwhile, in step (S1), a process of removing gases in the cells may be carried out, and such a process may be made under the same or different conditions for each of the first cell and the second cell.

Also, in step (S1), an aging process of the cells may be carried out, and the aging process may be made under the same or different conditions for each of the first cell and the second cell.

Further, in accordance with another aspect of the present invention, there is provided a lithium secondary battery prepared from the above-mentioned method.

The lithium secondary battery may be operated at a voltage less than the uniform potential voltage region of the first cathode active material.

Advantageous Effects

According to the present disclosure, a lithium secondary battery can be prepared by bringing a first cell using a first cathode active material of the above formula (I) and a second cell using a second cathode active material being generally used into activation under different voltage conditions, and then electrically connecting the first cell and the second cell in the step of assembling unit cells, thereby achieving high capacity from the first cell and life performance improvement from the second cell in balance.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

FIG. 1 is a graph showing capacity retention (%) of batteries prepared in the Example and the Comparative Examples of the present disclosure.

BEST MODE

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments proposed herein are just a preferable example for the purpose of illustrations only, not intended to limit the scope of the disclosure, so it should be understood that other equivalents and modifications could be made thereto without departing from the spirit and scope of the disclosure.

One aspect of the present disclosure provides a method for preparing a lithium secondary battery, comprising: (S1) bringing a first cell comprising a first cathode active material of formula (I) into activation under voltage conditions being above uniform potential voltage region that the structural variation of the first cathode active material occurs, and bringing a second cell comprising a second cathode active material into activation under voltage conditions being below uniform potential voltage region that the structural variation of the first cathode active material occurs; and (S2) electrically connecting the first cell and the second cell in parallel or series:

$$Li(Li_xM_{y-y'}M'_{y'})O_{2-z}A_z \quad (I)$$

wherein, x, y, y', and z satisfy 0<x<0.5, 0.6<y<1.1, 0≤y'<0.2, and 0≤z<0.2,

M is any one selected from the group consisting of Mn, Ni, Co, Fe, Cr, V, Cu, Zn, and Ti, M' is any one selected from the group consisting of Al, Mg and B; and A is any one selected from the group consisting of F, S and N.

Generally, a lithium secondary battery that has a cathode comprising a cathode active material represented by the following formula (I) exhibits a high capacity when being activated at a high voltage, but has poor life time and low rate characteristics owing to its local structure change, as compared with a lithium secondary battery having a cathode comprising a general layered lithium-metal oxide.

As a conventional method for compensating such poor life time and low rate characteristics, there has been an attempt that a cathode active material represented by the following formula (I) is mixed with a general layered lithium-metal oxide such as LiNi$_{1-x-y}$Co$_x$Mn$_y$O$_2$ (0≤x≤0.5, 0≤y≤0.5) and LiCoO$_2$ in the preparation of an electrode to obtain a cathode and then a cell. However, when a cell comprising such a mixed cathode active material is initially activated under high voltage, the general layered lithium-metal oxide undergoes durability deterioration to result in the rapid life shortening and performance deterioration of the cell during operation.

However, according to the present disclosure, the second cell comprising a general cathode active material, not a cathode active material represented by the following formula (I), is brought into activation under voltage conditions being below uniform potential voltage region that the structural variation of the cathode active material represented by the following formula (I) occurs, and then the first cell and the second cell are connected in parallel or series in the step of assembling unit cells, thereby achieving high capacity from the first cell and life performance improvement from the second cell in balance.

In the present disclosure, the voltage region that the structural variation of the first cathode active material occurs may be in the range of a uniform potential voltage ranging from 4.3 to 4.8 V. When such a voltage region condition is satisfied, the structural variation of the first cathode active material is effectively made, thereby achieving the high capacity of the first cell.

Also, the second cathode active material may be any one selected from the group consisting of LiNiO$_2$, LiCoO$_2$, LiMn$_2$O$_4$, LiFePO$_4$, LiNi$_x$Co$_{x-1}$O$_2$ (1≤x≤2), LiNi$_{1-x-y}$Co$_x$Mn$_y$O$_2$ (0≤x≤0.5, 0≤y≤0.5), and a mixture thereof, but the present disclosure is not limited thereto.

In addition, the second cell may be brought into activation under voltage conditions of 4.3V or less. That is, the second cell is activated at a relatively low voltage, thereby preventing the second cell from its exposure to structural variation, high voltage and the decomposition of an electrolyte solution which may affect the life time and performances of batteries adversely.

In step (S1), a process of removing gases in the cells may be carried out, and such a process may be made under the same or different conditions for each of the first cell and the second cell, according to the desired purpose of the lithium secondary battery.

Also, in step (S1), an aging process of the cells may be carried out, and the aging process may be made under the same or different conditions for each of the first cell and the second cell, according to the desired purpose of the lithium secondary battery.

Meanwhile, the cathodes used in the first and second cells of the present disclosure have the structure that a cathode active material layer comprising a cathode active material, a conductive material and a binder is applied on one or both surfaces of a current collector. The cathode active materials used in the first and second cells are different from each other, as mentioned above.

The conductive material is not particularly limited if it is an electrically conductive material which does not cause chemical change in an electrochemical device. As the conductive material, carbon black, graphite, carbon fiber, carbon nanotube, metal powders, and conductive metal oxides may be generally used, and examples of a commercially available conductive material include acetylene black series (Chevron Chemical Company or Gulf Oil Company), Ketjen Black EC series (Armak Company), Vulcan, XC-72 (Cabot Company) and Super P (MMM Carbon Company).

Meanwhile, the anodes used in the first and second cells of the present disclosure have the structure that an anode active material layer comprising an anode active material and a binder is applied on one or both surfaces of a current collector.

The anode active material may be a carbon-based material, lithium metal, a metal compound or a mixture thereof which can conventionally intercalate and disintercalate lithium ions.

Specifically, the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, mesocarbon microbeads, mesophase pitches, and high-temperature sintered carbon such as petroleum or coal tar pitch derived cokes.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba. Such a metal compound may be used in the form of a combination, an alloy, an oxide (e.g., $TiO_2$ and $SnO_2$), a nitride, a sulfide, a boride, an alloy with lithium and any other form. Among these, forms such as a combination, an alloy, an oxide and an alloy with lithium can provide high capacity to a battery. In particular, a compound containing at least one metal selected from Si, Ge and Sn, preferably Si and Sn can provide even higher capacity to a battery.

The binder used in the cathode and the anode functions to maintain cathode and anode active materials in a current collector and connect the active materials with each other, and may be any one which is conventionally used.

For example, various kinds of polymer binders including vinylidene fluoride-hexafluoropropylene copolymer (PVDF-co-HFP), polyvinylidene fluoride, polyacrylonitrile, polymethylmethacrylate, styrene butadiene rubber (SBR) and carboxymethyl cellulose (CMC) may be used.

The current collector used in the cathode and anode may be made of any high conductive metal as long as a slurry of the active material can easily adhere and has no reactivity within the voltage range of a battery. Specifically, non-limiting examples of a cathode current collector include aluminum foils, nickel foils and a combination thereof, and non-limiting examples of an anode current collector include copper foils, gold foils, nickel foils, copper alloy foils and a combination thereof. The current collector may be used in a laminated form of substrates made of such materials.

Each of the cathode and anode may be prepared by mixing an active material, a binder and a solvent having a high boiling point to form an electrode composite and applying the composite on the copper foil of a current collector, followed by drying, pressing and then heat-treatment at a temperature of 50 to 250° C. under vacuum for about 2 hours.

Meanwhile, the separator which may be used in the present disclosure includes any one which has been conventionally used in the art, for example, porous membranes or non-woven fabrics made of a polyolefin-based polymer, but is not limited thereto.

The polyolefin-based porous membranes may be obtained from a polymer selected from polyethylenes such as a high-density polyethylene, a linear low-density polyethylene, a low-density polyethylene and an ultra-high molecular weight polyethylene, polypropylene, polybutylene, polypentene, and a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of a long fiber in structure.

The porous substrate has preferably a thickness of 5 to 50 μm, but is not particularly limited thereto. Also, the porous substrate has a pore size of 0.01 to 50 μm and a porosity of 10 to 95%, but is not particularly limited thereto.

Meanwhile, an electrolyte solution used in the present disclosure comprises an organic solvent and an electrolyte salt being a lithium salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent used in the electrolyte solution may be any one which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof is representatively used.

The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

Meanwhile, the anode active materials, the separators, the non-aqueous electrolyte solution used in the first and second cells may be the same or different from each other, according to the desired purpose of the lithium secondary battery.

Also, the electrical connecting of the first cell and the second cell may be carried out by way of adhesion that is made by welding electrode leads, or may be carried out by welding taps in a batter case.

Further, another aspect of the present invention provides a lithium secondary battery prepared from the above-mentioned method.

The lithium secondary battery may be operated at a voltage less than the uniform potential voltage region of the first cathode active material. Thereby, during battery operation, the second cathode active material used in the second cell does not undergo its structural variation, making it prevent the performance deterioration of the battery.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

1. Example
(1) First Cell
1) Preparation of Cathode

To N-methylpyrrolidone (NMP) used as a solvent, $Li(Li_{0.2}Mn_{0.55}Ni_{0.15}Co_{0.1})O_2$ as a cathode active material, Denka black as a conductive material, and PVDF as a binder were added in a ratio of 90:5:5 to obtain a slurry, and the slurry was coated on an Al-foil having a thickness of 20 μm as a cathode current collector, followed by rolling and drying, to prepare a cathode.

2) Preparation of Anode

To deionized water used as a solvent, 96 wt % of natural graphite as an anode active material, 3 wt % of PVDF as a binder, and 1 wt % of Denka black as a conductive material were added to obtain a slurry, and the slurry was coated on a Cu-foil having a thickness of 10 μm as an anode current collector, followed by rolling and drying, to prepare an anode.

3) Preparation of First Cell

The cathode, the anode, and a separator consisting of three layers being poly propylene/polyethylene/polypropylene (PP/PE/PP) were used in a stacked and folded form, to obtain a polymer pouch-type battery having a 25 mAh capacity at 1 C discharge rate. In the battery, a non-aqueous electrolytic solution (ethylene carbonate (EC):propylene carbonate (PC):diethyl carbonate (DEC)=30:20:50 (wt %), 1M lithium hexafluorophosphate) was introduced.

(2) Second Cell

The same procedures as the first cell were repeated except that N-methylpyrrolidone (NMP) used as a solvent, $LiNi_{1/3}Co_{1/3}Mn_{1/3}O_2$ as a cathode active material, Denka black as a conductive material, and PVDF as a binder were used in a ratio of 93:4:3 to obtain a slurry, and the slurry was coated on an Al-foil having a thickness of 20 μm as a cathode current collector, followed by rolling and drying, to prepare a cathode. Thereby, a second cell was prepared.

(3) Activation of First Cell and Second Cell

The first cell was charged with a current density of 0.1 C up to 4.6 V under CC/CV conditions (cut-off current 0.05 C). Then, after discharging up to 2.5 V under CC conditions, a portion of a polymer pouch case was cut, followed by degassing for 2 seconds under vacuum (−95 kPa), and the cutting portion was again sealed with heat and pressure.

The second cell was charged with a current density of 0.1 C up to 4.25 V under CC/CV conditions (cut-off current 0.05 C). Then, after discharging up to 2.5 V under CC conditions, a portion of a polymer pouch case was cut, followed by degassing for 2 seconds under vacuum (−95 kPa), and the cutting portion was again sealed with heat and pressure.

(4) Assembling of First Cell and Second Cell

After completing the activation of the first and second cells, the metal lead of the first cell was connected with one of the second cell in parallel by ultrasonic welding between both cathodes and between both anodes. Then, the cells were operated at the voltage region of 4.25 V to 2.5 V.

2. Comparative Example

The procedures of the Example were repeated except that both the first and second cells were charged up to 4.6 V during their activation, to connect the first and second cells in parallel.

3. Evaluation of Battery Life Time

After parallel connection of each first cell and each second cell in the Example and the Comparative Example, each battery obtained was repeatedly charged and discharged at 45° C. under the conditions of 1 C charge (4.25 V CC/CV, cut-off 0.05 C) and 1 C discharge (2.5 V CC/CV, cut-off), and then measured for its capacity retention over cycles.

FIG. 1 is a graph showing capacity retention (%) of batteries prepared from the parallel connection of each first cell and each second cell in the Example and the Comparative Examples.

From FIG. 1, the battery of the Example was confirmed to exhibit superior life characteristics over that of the Comparative Example.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. A method for preparing a lithium secondary battery, comprising:
   (S1) bringing a first cell comprising a first cathode active material of formula (I) into activation under voltage conditions ranging from 4.3 V to 4.8V, and bringing a second cell comprising a second cathode active material into activation under voltage conditions of 4.3 V or less, wherein the activation voltages for the first cell and the second cell are different; and
   (S2) after completing the activation of the first and second cells, electrically connecting the first cell and the second cell in parallel or series:

$$Li(Li_xM_{y-y'}M'_{y'})O_{2-z}A_z \qquad (I)$$

wherein, x, y, y', and z satisfy $0<x<0.5$, $0.6<y<1.1$, $0\leq y'<0.2$, and $0\leq z<0.2$, M is any one selected from the group consisting of Mn, Ni, Co, Fe, Cr, V, Cu, Zn, and Ti, M' is any one selected from the group consisting of Al, Mg and B; and A is any one selected from the group consisting of F, S and N.

2. The method of claim 1, wherein, the second cathode active material is at least one of of $LiNiO_2$, $LiCoO_2$, $LiMn_2O_4$, $LiFePO_4$, $LiNi_xCo_{x-1}O_2$ ($1\leq x\leq 2$), $LiNi_{1-x-y}Co_xMn_yO_2$ ($0\leq x\leq 0.5$, $0\leq y\leq 0.5$), or a mixture thereof.

3. The method of claim 1, wherein in the step (S1) further comprises removing gases in the first and second cells, under same or different conditions for each of the first cell and the second cell.

4. The method of claim 1, wherein the step (S1) further comprises aging of the first and second cells under same or different conditions for each of the first cell and the second cell.

5. A lithium secondary battery prepared from the method of claim 1.

6. The lithium secondary battery of claim 5, which is operated at 4.3V or less.

* * * * *